United States Patent [19]

Genna

[11] 3,951,338

[45] Apr. 20, 1976

[54] HEAT-SENSITIVE SUBSURFACE SAFETY VALVE

[75] Inventor: Marion David Genna, New Orleans, La.

[73] Assignee: Standard Oil Company (Indiana), Chicago, Ill.

[22] Filed: July 15, 1974

[21] Appl. No.: 488,621

[52] U.S. Cl. .............................. 236/93 A; 236/100; 166/64; 166/224 A; 137/468
[51] Int. Cl.² ........................................ G05D 23/00
[58] Field of Search ............ 137/468; 236/93, 99 F, 236/99 J, 99 G, 99 R, 101 C, 100; 166/57, 64, 224, 224 A

[56] References Cited
UNITED STATES PATENTS

| 2,213,950 | 10/1940 | Crites | 166/57 UX |
| 3,456,722 | 7/1969 | Cornelius | 166/64 |
| 3,687,365 | 8/1972 | Laessig | 236/99 J |
| 3,804,167 | 4/1974 | Swift | 236/99 U |
| R20,584 | 12/1937 | Jorgensen | 236/99 F X |

Primary Examiner—Harold W. Weakley
Attorney, Agent, or Firm—John D. Gassett; Pawl F. Hawley

[57] ABSTRACT

This is a subsurface safety valve for insertion in a tubing string centered in a well drilled in the earth normally for the production of oil or gas. Under normal flow conditions, a spring holds a flapper valve in an open position out of the flow path of the fluid. An increase in the temperature of the fluids flowing through the valve supplies the force to push the flapper into the flow stream where the fluid flow will cause it to close. A heat-sensitive fluid is contained in an annular reservoir surrounding the flow path of the fluid through the valve and an annular piston is in one end of the cylinder. Expansion of the fluid causes movement of the piston which has a rod which forces the flapper valve into the main fluid flow stream.

3 Claims, 3 Drawing Figures

HEAT-SENSITIVE SUBSURFACE SAFETY VALVE

BACKGROUND OF THE INVENTION

1. Field of the Invention

This invention relates to a safety valve for use in the production of oil and gas. It especially relates to a safety valve set in a tubing string of a well drilled in an offshore or water-covered area. In such situations the safety valve is usually set in the tubing string below the mudline. Then, if the tubing string is broken by any means such as a ship or barge which may be adrift in a storm, the subsea safety valve will shut off the flow of fluids through the tubing string and prevent a "runaway" well which would otherwise occur.

2. Prior Art

There are many subsurface safety valves which are commercially available and even many others that have been described in the patents and literature. Some of these valves are operated or controlled from the surface, normally by a long slender tube which supplies fluid under pressure to hold the valve in an open position. If the control fluid supply should be disrupted, the valve automatically closes. Another type downhole safety valve is that group which are self-contained, they usually depend upon a pressure drop through the valve as the actuating medium or force. If the pressure drop through the valve becomes excessive, the valve is forced to a closed position. The present invention belongs in the self-contained group but does not depend upon a pressure drop through the valve; in fact, an object of this invention is to maintain as low a pressure drop as possible.

Perhaps the closest prior art is U.S. Pat. No. 1,961,280, W. J. Crites et al., for "Method and Apparatus for Controlling Oil Wells," issued June 5, 1934. That patent is not, in a strict sense, a safety control valve but rather is a temperature-sensitive device at the bottom of a wellbore so that the well may be produced at a rate and/or in such a manner that the least amount of gas will be produced. In the device of that patent, an increase in temperature causes an increase in the flow of oil and gas and, likewise, a decrease in temperature causes a decrease in the flow of oil and gas. This is the opposite of what occurs in the present invention.

SUMMARY OF THE INVENTION

This invention concerns a subsurface safety valve for insertion in a tubing string suspended in a wellbore drilled in the earth; primarily for those wells drilled in water-covered areas. The safety valve is placed below the mudline. The safety valve includes a housing, having a longitudinal bore therethrough and a reservoir containing a heat-sensitive fluid expandable with increased temperature which surrounds at least a part of the bore. An annular downward facing valve seat is contained within the bore. A valve for closing against the valve seat is retained normally within a valve receiving pocket within the housing. The valve is connected to a pivot on the upper end of the pocket. Biasing means urging the valve to rotate about the pivot to an open position and to remain within the pocket is provided. Means responsive to the heat-sensitive fluid that rotates the valve in a direction about the pivot opposite to the rotation caused by the biasing means. Upon an increase in temperature the valve is pushed into the flow path in the bore and the flow of the fluid causes the valve to close against the valve seat and holds it shut.

BRIEF DESCRIPTION OF THE DRAWINGS

Various objects and a better understanding can be had of the invention by the following description taken in conjunctiion with the drawing in which.

DETAILED DESCRIPTION OF THE INVENTION

Figure 1:
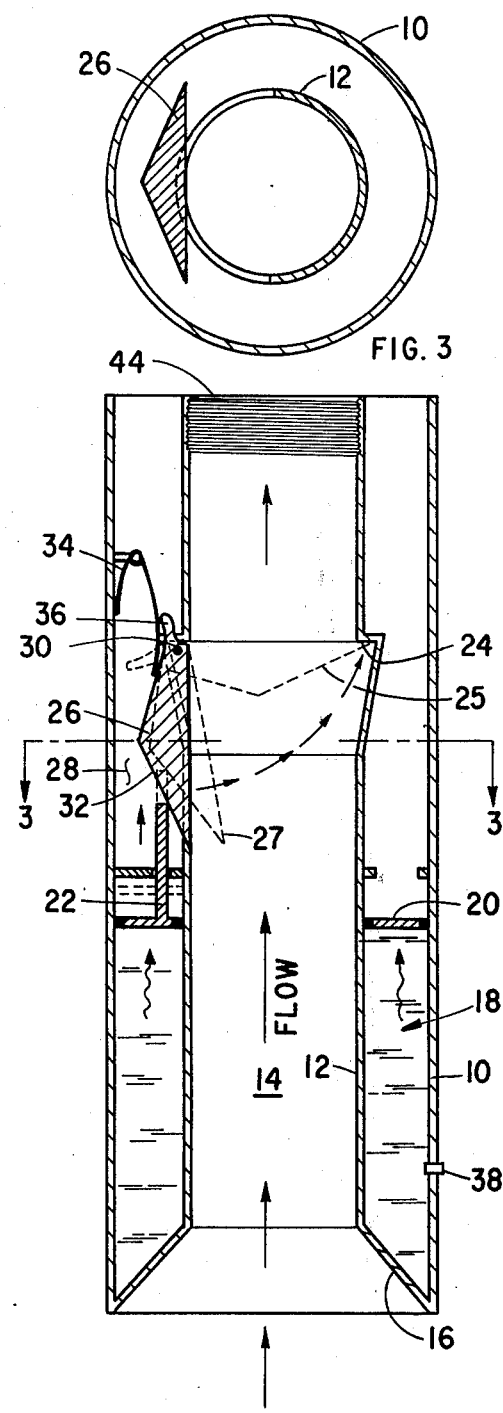
FIG. 1 is a cross sectional view of the valve of the invention.

Attention is first directed to FIG. 1 which shows the main features of the valve of this invention. Shown thereon is an outer cylindrical housing 10 and an inner cylinder member 12 concentric with the outer housing 10. A bore 14 within inner cylinder member 12 extends throughout the length of the valve. The lower end of the annulus between housing 10 and inner cylinder member 12 is closed by end member 16. A heat-sensitive fluid retaining reservoir 18 is formed in the annulus between housing 10 and inner cylinder member 12 and is closed at the upper end by a piston member 20, which has an upwardly extending piston rod 22. Reservoir 18 is filled with a fluid which is expandable with increased temperature. A suitable fluid is mercury. This fluid, at a constant pressure, increases about 0.018% in volume for each degree Centigrade increase in temperature.

The upper portion of the bore 14 is recessed to form a downwardly facing annular shoulder 24 which serves as a valve seat. The valve illustrated is a flapper valve 26 which rests within pocket 28 which is above piston rod 22 and piston 20. Flapper valve 26 is pivoted at its upper end by pivot 30. The front side of flapper valve 26 is flat so that it can seal against annular seal seat 24. The back side of flapper valve 26 has a sloping surface or face 32, which is in contact with the upper end of piston rod 22. The valve 26 is biased to an open position by spring member 34 which urges against extension 36 of the valve above pivot 30. This forces face 32 of the valve 26 against the upper end of piston rod 22.

The heat-sensitive expandable fluid is inserted into reservoir 18 through a plug means 38 in the wall of housing 10. A sufficient amount is put in so that when the temperature reaches an anticipated operational temperature $T_1$, piston 20 will be in a position such that rod 22 will be adjacent to face 32 of valve 26 but will not be extended high enough to push the valve 26 into the bore 14. One can determine temperature $T_1$, that can be called the equilibrium temperature, from a knowledge of the fluid flowing from the wellbore through bore 14 and the quantity in which it will be flowing. From this information one will know the charge of heat-sensitive fluid to put into reservoir 18. When a charge is first put in the reservoir, it will be at a lower temperature that when it is in the wellbore and therefore piston 20 will be at a lower position than it will be in the wellbore so that when the tool is first run in the hole spring 34 will hold flapper valve 26 in pocket 28 in an open position.

During operations, as long as everything is operating normally, the temperature of the fluid in reservoir 18 will stabilize at temperature $T_1$ and force piston 20 upwardly but not sufficiently high to force the valve 26 out into the flow stream in bore 14. However, if the upper controls on the tubing are damaged or broken away, produced fluid will flow through bore 14 at a very high rate. When this occurs the warm fluid from the formation will heat the fluid in reservoir 18 at a faster rate than it is dissipated (and at a faster rate than when the flow was smaller). The fluid in reservoir 18 will then heat up and expand, driving piston 20 upwardly. This, in turn, causes piston rod 22 to contact face 32 of flapper valve 26 and shove the lower tip end 27 out into the flow stream in bore 14. As soon as this occurs, the fluid flow will drive the valve in an upwardly position until it seats on seat 24 as shown by dashed lines 25. Typically, when the upper controls are damaged or destroyed and the wellbore or tubing is open at the surface, the flow of fluid through bore 14 will be twice or more the flow flowing therethrough under normal operating conditions. This will be more than adequate to heat the fluid in reservoir 18 sufficient to cause the valve 26 to be closed.

Figure 3:
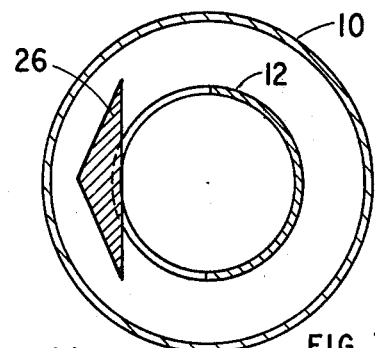
FIG. 3 illustrates a section taken along the line 3—3 of FIG. 1.
Figure 2:
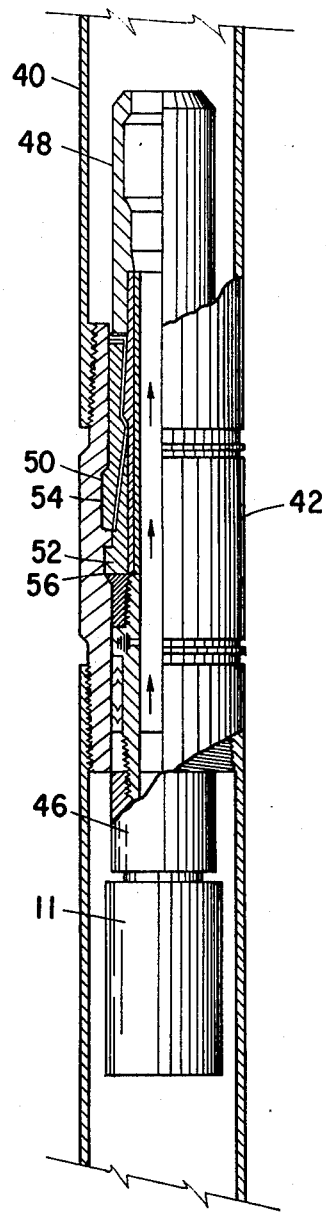
FIG. 2 shows the valve in position in a downhole tubing string.

Attention is now directed to FIG. 2 which shows how the safety valve is inserted in a string of tubing. Shown in FIG. 2 is a string of tubing 40 which has the safety valve 11 positioned therein. The tubing string 40 was made up with a landing nipple 42 inserted therein. The safety valve 11 is connected by its threads 44 to an equalizing sub 46. Equalizing sub 46 is connected to a locking mandrel 48. Equalizing subs, landing nipples, and locking mandrels are all well known and are all commercially available. Therefore, no great detail will be given to their operation. It will suffice to say that the locking mandrel has locking dogs 50, 52 which lock into recesses 54 and 56, respectively, of landing nipple 42. Methods and means for setting a locking mandrel and then later removing it from a landing nipple are well known and will not be discussed herein.

After the safety valve closes, heat will dissipate from the fluid in reservoir 18. However, the reservoir pressure from below will keep the safety valve closed until repairs are made at the surface. Once the upper part of tubing 40 has been repaired and returned to its normal condition, the valve can be returned to an open position by conventional means, by either pressuring up on the safety valve from above or by using a prong on wire line to force the valve open. Once the valve is forced back in pocket 28, it will stay there or be retained by spring 34 during normal operations.

There are no flow restrictions in normal operations through bore 14. Thus, the pressure drop therethrough will be rather small. The pressure drop will be caused by the difference in the reduced diameter of bore 14 from the diameter of the tubing 40. This can be minimized by good engineering practices.

While the above invention has been described in detail, it is possible to make various modifications thereof without departing from the sphere or scope of the invention.

I claim:

1. A subsurface safety valve for insertion in a tubing string suspended in a wellbore which comprises:
    a housing having a longitudinal bore therethrough and a valve receiving pocket;
    a reservoir containing a heat sensitive fluid expandable with increased temperature, said reservoir surrounding at least a part of said bore;
    an annular, downwardly facing valve seat within said bore;
    a valve for closing against said valve seat, said valve normally retained within a valve receiving pocket within said housing, said valve connected to a pivot within said pocket;
    biasing means urging said valve to rotate about said pivot to an open position within said pocket;
    means responsive to said heat sensitive fluid to rotate said valve in a direction opposite the rotation caused by said biasing means.

2. A valve as defined in claim 1 in which said means responsive to said heat-sensitive fluid includes:
    a piston within said reservoir movable by said heat-sensitive fluid;
    force transmitting means between said piston and said valve to force said valve into said bore upon increase of heat applied to said fluid.

3. A valve as defined in claim 2 in which said force transmitting means includes a piston rod connected to said annular piston.

* * * * *